Patented Jan. 31, 1928.

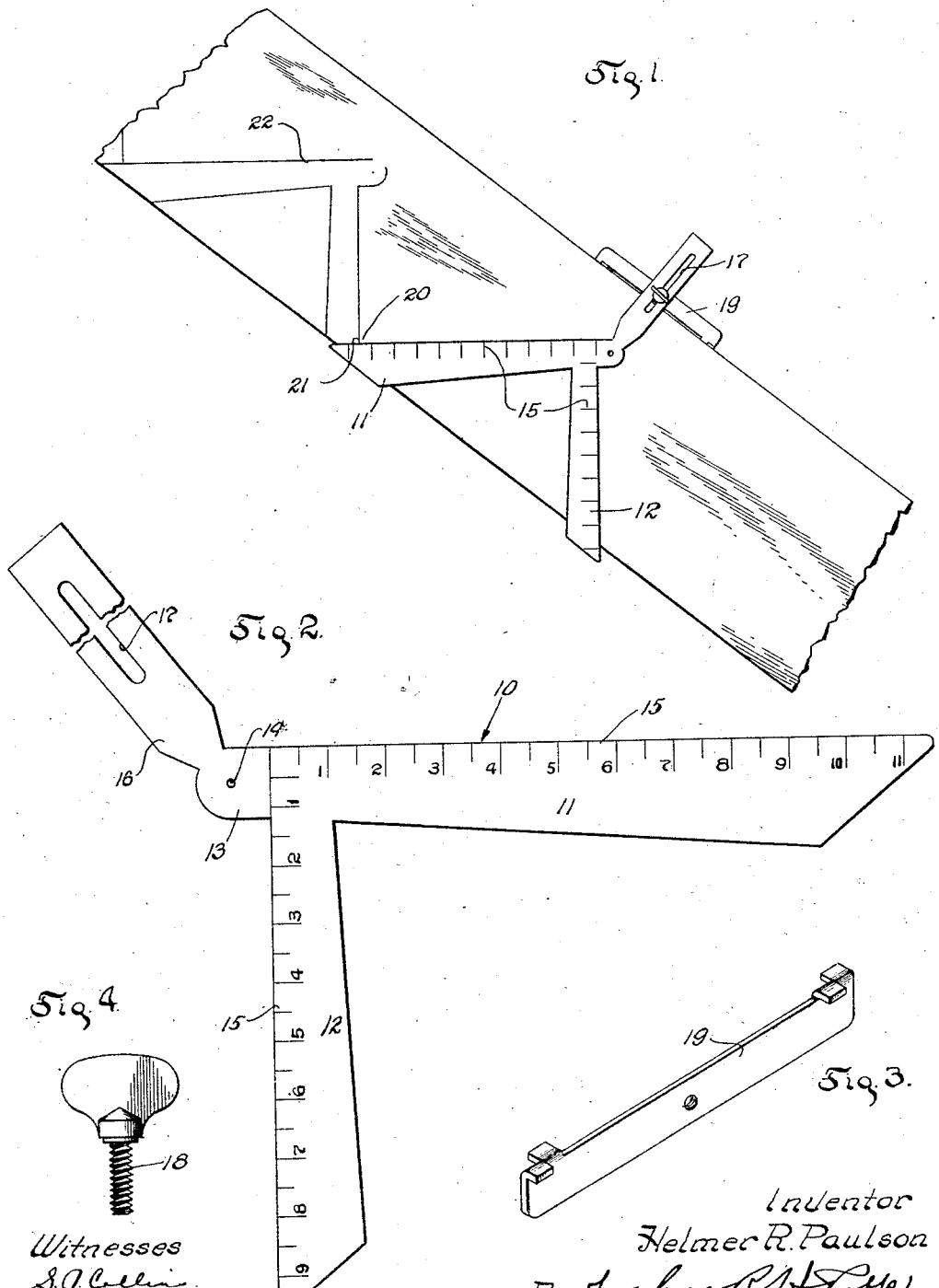

1,657,547

UNITED STATES PATENT OFFICE.

HELMER R. PAULSON, OF LA GRANGE, ILLINOIS.

GAUGE.

Application filed June 24, 1927. Serial No. 201,039.

My invention relates to a gauge, and more particularly to a graduated gauge for use by carpenters, and the object of my invention is to provide such a device which is particularly useful and adapted for gauging and marking out the positions on tread girders for the purpose of framing the same.

In the accompanying drawing.

Figure 1 represents a gauge as in use, and incorporating my invention.

Figure 2 is a plan view of the graduated blades and shank of the gauge shown in Figure 1.

Figure 3 is a perspective view of the adjustable sliding member.

Figure 4 is an elevational view of the set screw used for securing the parts together, and for adjusting the same.

In the drawing, and for the purpose of illustration, I have shown the preferred embodiment of my invention, which comprises a graduated gauge 10 consisting of a tread blade 11, and a riser blade 12 intersecting at substantially right angles. The blades 11 and 12 increase in width toward their extremities, and are tapered off at their extreme ends. A rounded portion 13 is provided on one end of the tread blade, and this portion is provided with an opening 14 through which the end of a punch or similar tool may be inserted for making a mark on the tread girder, for the purpose of positioning a bit for making a rounded portion of the recess in the tread girder in which the tread is to be positioned.

The blades 11 and 12 are each provided with a scale or graduated portion 15 for the purpose of gauging the relative height and width of the riser and tread respectively. A shank or handle portion 16 is provided integral with the portion 13, and extends upwardly at a convenient angle, and has slot 17 therethrough for receiving a set screw 18, which is adapted to adjustably secure the sliding member 19 on to said shank, at any suitable angle.

When in use, this device is employed as follows: It is first determined what ratio of height of riser to width of tread is to be used, and for instance a tread 8 inches wide and a riser 6 inches high is desired. This gauge is placed on the tread girder in such a position that the 8 on the tread blade and the 6 on the riser blade come to the lower edge of the tread girder, and a mark of any suitable length is made along the edge of the tread blade on the girder. The gauge is then moved upwardly to a position sufficiently in from the lower edge of the girder to prevent the corner 20 from being off the edge, and accurately positioned parallel with the line heretofore mentioned. The set screw 18 is loosened and the sliding member 19 is brought down upon the upper edge of the girder as shown in Figure 1, and the set screw is again tightened for holding the parts in their relative positions. A line is then traced around the upper and lower sides of the gauge, and a small mark or point is positioned on the girder at a point along the upper side of the tread blade at Figure 8, or the place chosen as the width of the tread, such as at 21. The gauge is then moved upwardly along the girder until the outer edge of the riser blade reaches the point 21, and having the gauge in this position with the member 19 on the edge of the girder as previously, another line is traced around the gauge, which is represented by 22. The marks or lines 22 are guide lines for sawing or otherwise cutting grooves in the tread girder, and it will be noted that the ratio of tread to riser is exactly the same all the way along the girder, and it is only necessary to make one adjustment of the member 19 for getting the original setting, and the rest of the settings are automatically arrived at by simply moving the gauge with the sliding member 19 along the upper edge of the girder.

Having described my invention in its preferred form, it is capable of variation without departing from the spirit of the invention, and I do not wish to be limited to the precise details of construction illustrated and described, but desire to avail myself of such variations and modifications as come within the scope of the appended claims.

I claim as my invention:

1. A device of the class described, comprising a metallic plate having blades intersecting at their ends at substantially right angles to each other; said blades increasing in width from their intersecting ends toward the other extremities thereof; a shank integral with said intersecting blades, and an angularly adjustable slide member secured to said shank for holding said device in adjusted position upon the work.

2. A device of the class described, comprising a metallic plate having blades intersecting at their ends at substantially right angles to each other; said blades increasing in width from their intersecting ends toward the other extremities thereof; there being a scale on each of said blades, and a shank for holding said device in adjusted position upon the work; a rounded portion on one end of one of said blades, having an opening adapted to receive a punch therethrough, said shank extending from said rounded portion.

3. A device of the class described, comprising a metallic plate having a riser blade and a tread blade intersecting at their ends at substantially right angles; said blades increasing in width from their intersecting ends toward the other extremities thereof; a rounded portion on one end of said tread blade, and having an opening in said rounded portion for receiving a punch therein, and means integral with and extending from said rounded portion for holding said device in adjusted position upon the work.

4. A device of the class described, comprising a metallic plate having a riser blade and a tread blade intersecting at substantially right angles; said baldes increasing in width toward the extremities thereof, a rounded portion on one end of said tread blades, and having an opening in said rounded portion for receiving a punch therein, there being a scale on each of said blades; a shank integral with said intersecting blades, and an adjustable slide member secured to said shank for holding said device in adjusted position upon the work.

In testimony whereof I have signed my name to this specification.

HELMER R. PAULSON